United States Patent [19]

Clagett et al.

[11] Patent Number: 4,918,149

[45] Date of Patent: Apr. 17, 1990

[54] POLYPHTHALATECARBONATE/POLY-CARBONATE RESIN BLENDS

[75] Inventors: Donald C. Clagett; Daniel W. Fox; Sheldon J. Shafer; Paul D. Sybert, all of Pittsfield, Mass.

[73] Assignee: General Electric Company, Pittsfield, Mass.

[21] Appl. No.: 266,978

[22] Filed: Nov. 4, 1988

[51] Int. Cl.$^4$ .................. C08F 20/00; C08L 69/00
[52] U.S. Cl. .................. 525/439; 525/466
[58] Field of Search .................. 525/439, 466

[56] References Cited

U.S. PATENT DOCUMENTS

| | | | |
|---|---|---|---|
| 3,028,365 | 4/1962 | Schnell et al. | 260/47 |
| 3,030,331 | 4/1962 | Goldberg | 260/42 |
| 3,169,121 | 2/1965 | Goldberg | 260/47 |
| 3,275,601 | 9/1966 | Schnell et al. | 260/47 |
| 3,334,154 | 8/1967 | Kim | 260/860 |
| 3,915,926 | 10/1975 | Wambach | 252/8.1 X |
| 4,156,069 | 5/1979 | Prevorsek et al. | 528/182 |
| 4,188,314 | 2/1980 | Fox et al. | 525/433 X |
| 4,194,038 | 3/1980 | Baker et al. | 528/182 |
| 4,238,596 | 12/1980 | Quinn | 528/179 |
| 4,238,597 | 12/1980 | Markezich et al. | 528/179 |
| 4,469,850 | 9/1984 | Belfoure et al. | 525/439 |
| 4,522,980 | 6/1985 | Miller | 525/67 |
| 4,535,104 | 8/1985 | Pyles | 524/91 |
| 4,605,726 | 8/1986 | Mark | 528/190 |
| 4,621,130 | 11/1986 | Rosenquist | 528/176 |
| 4,621,132 | 11/1986 | Quinn et al. | 528/194 |
| 4,696,995 | 9/1987 | Peters | 528/206 |
| 4,727,184 | 2/1988 | Rosenquist | 562/442 |
| 4,746,711 | 5/1988 | Serini et al. | 525/439 |

FOREIGN PATENT DOCUMENTS 8301255  4/1983  European Pat. Off. .

OTHER PUBLICATIONS

DL Love, How Polyarylates Resist Weathering, Modern Plastics, Mar. 1984.

SM Cohen, Transparent Ultraviolet-Barrier Coatings, Journal of Polymer Science: Part A-1, vol. 9, 3263-3299 (1971).

*Primary Examiner*—Theodore E. Pertilla
*Attorney, Agent, or Firm*—Spencer D. Conard

[57] ABSTRACT

A polyphthalatecarbonate/polycarbonate blend exhibits improved resistance to hazing and yellowing from prolonged exposure to ultraviolet radiation. The blend is useful in the production of transparent, ultraviolet radiation stable sheets and films.

9 Claims, No Drawings

POLYPHTHALATECARBONATE/POLYCARBONATE RESIN BLENDS

BACKGROUND OF THE INVENTION

1. Field of the Invention

This invention relates to polyphthalatecarbonate/polycarbonate resin blends and, more particularly, relates to polyphthalatecarbonate/polycarbonate resin blends exhibiting high level of resistance to yellowing and hazing from exposure to ultraviolet radiation.

2. Description of the Related Art

Aromatic polycarbonate resins, for example those derived from bisphenol A and phosgene, have found particular utility in glazing applications such as transparent sheets and films for windows. These polycarbonates, however, suffer from hazing and yellowing upon extended exposure to ultraviolet radiation. Prior solutions have involved the coating of these sheets and films and ultraviolet radiation absorbers. Coating technologies however suffer from a number of problems including the employ of expensive coatings and equipment and the use of organic solvents.

Polyestercarbonate resins also find widespread utility, particularly for glazing and transparent sheet applications demanding high impact resistance, high resistance to scratching, or high solvent resistance. However, the usefulness of polyestercarbonate resin is limited by its high susceptibility to, and rate of, yellowing during exposure to light, especially sunlight. For example during accelerated light aging studies, unstabilized polyestercarbonate resin becomes noticeably yellow (change in yellowness index of about 5) after less than 5 hours of exposure to RS sunlamps (see for example U.S. Pat. No. 4,556,606). This yellowing is the result of the polyestercarbonate resins, upon exposure to ultraviolet radiation, undergoing a photo-Fries rearrangement which converts ester bond linkages to ketone groups which results in a yellowing of the surface of the polyestercarbonate resin. Photo-Fries rearranging is discussed in Adv. Photochem, 8, 109-159 (1971) and in U.S. Pat. No. 4,534,104. Prior attempts to prevent this surface yellowing have involved applying ultraviolet radiation absorbing coatings to the polyestercarbonate resin articles but as set out above, coating technologies have a number of shortcomings.

An object of the present invention is to provide a thermoplastic resin which exhibits the excellent properties associated with aromatic polycarbonate resins and polyestercarbonate resins and which exhibits high levels of resistance to yellowing from ultraviolet radiation exposure.

Another object of the present invention is to provide a thermoplastic resin which is suitable for glazing applications and which exhibits high levels of resistance to ultraviolet radiation without the employ of ultraviolet radiation absorbing coatings.

An additional object to provide an aromatic polycarbonate resin blend which exhibits excellent resistance to yellowing upon extended exposure to ultraviolet radiation.

SUMMARY OF THE INVENTION

The present invention provides a thermoplastic blend comprising an aromatic polycarbonate resin and a small percentage of a polyphthalatecarbonate resin. The blend exhibits low levels of initial yellowness and excellent resistance to yellowing and hazing over extended exposure to ultraviolet radiation.

DETAILED DESCRIPTION OF THE INVENTION

The instant invention involves thermoplastic resin blends comprising (a) an aromatic polycarbonate resin present at a level selected from between about 80 and about 95 percent by weight of said blend and (b) a polyphthalatecarbonate resin present at a level selected from between about 5 and about 20 percent by weight of said blend.

Suitable polycarbonate resins which can be used in the blend of the present invention are set forth in U.S. Pat. Nos. 3,161,615; 3,220,973; 3,312,659, 3,312,660, 3,313,777; 3,666,614; 3,989,672, all of which are incorporated herein by reference. The polycarbonates may be conveniently prepared by the reaction of at least one dihydric phenol with a carbonate precursor via the interfacial polymerization process. Typically, the dihydric phenols utilized may be represented by the general formula:

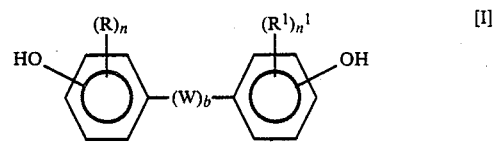

wherein;

R in independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals,

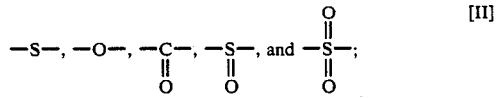

n and $n^1$ are independently selected from integers having a value of form 0 to 4 inclusive; and b is either zero or one.

The monovalent hydrocarbon radicals represented by R and $R^1$ include the alkyl, cycloalkyl, aryl, aralkyl, and alkaryl radicals. The preferred alkyl radicals are those containing from 1 to about 10 carbon atoms. The preferred cycloalkyl radicals are those containing from 4 to about 8 ring carbon atoms. The preferred aryl radicals are those containing from 6 to 12 ring carbon atoms, i.e., phenyl, biphenyl, and naphthyl. The preferred aralkyl and alkaryl radicals are those containing from 7 to about 14 carbon atoms.

The preferred halogen radicals represented by R and $R^1$ are chlorine and bromine.

The hydrocarbonoxy radicals represented by R and $R^1$ may be represented by the formula $—OR^3$ wherein $R^3$ has the same meaning as R. The preferred hydrocarbonoxy radicals are the alkoxy and aryloxy radicals.

The divalent hydrocarbon radicals represented by W include the alkylene, alkylidene, cycloalkylene, and cycloalkylidene radicals. The preferred alkylene radicals are those containing from 2 to about 30 carbon atoms. The preferred aliylidene radicals are those containing from 1 to about 30 carbon atoms. The preferred cycloalkylene and cycloalkylidene radicals are those containing from 4 to about 16 ring carbon atoms.

Some illustrative non-limiting examples of suitable dihydric phenols include:
2,2-bis(4-hydroxyphenyl)propane;
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclihexane;
1,1-bis(4-hydroxyphenyl)cyclododecane;
1,1-bis(4-hydroxyphenyl)dodecane;
4,4'-thiophenol;
bis(4-hydroxyphenyl)methane; and
2,2-bis(4-hydroxyphenyl)pentane.

Other useful dihydric phenols are also available and are described, inter alia, in U.S. Pat. Nos. 2,999,835; 3,028,365 and 3,334,154, all of which are incorporated herein by reference.

It is, of course, possible to employ a mixture of two or more different dihydric phenols in the preparation of the polycarbonates of the instant invention.

The carbonate precursors employed in the instant invention may be carbonyl halide, a carbonate ester or a bishaloformate. The carbonyl halides which may be employed are carbonyl bromide, carbonyl chloride and mixtures thereof. Typical of the carbonate esters which may be employed are the dairyl carbonates such as diphenyl carbonate; di(halophenyl)carbonates such as di(chlorophenyl)carbonate, di(bromophenyl)carbonate, and di(trichlorophenyl)carbonate; di(alkylphenyl)carbonates such as di(tolyl)carbonate; di(naphthyl)carbonate; di(chloronaphthyl)carbonate; phenyl tolyl carbonate; and chlorophenyl chloronaphthyl carbonate. The bishaloformates suitable for use as carbonate precursors include the bishaloformates of hydroquinone, bishaloformates of bisphenol-A; bishaloformates of glycols such as the bis-haloformates of ethylene glycol, neopentyl glycol, and polyethylene glycol. While other carbonate precursors will occur to those skilled in the art, carbonyl chloride, also known as phosgene, is the preferred carbonate precursor.

The polycarbonate is substantially free of ester linkages. Preferably the polycarbonate has less than 1 mole percent ester linkages as compared to the combined total of carbonate and ester linkages therein.

Also included herein are branched polycarbonates wherein a polyfunctional aromatic compound is reacted with the dihydric phenol and carbonate precursor to provide a thermoplastic randomly branched polycarbonate wherein the recurring units of formula I contain branching groups.

Most preferred polycarbonate resins are those derived from the reaction of bisphenol-A and phosgene. These polycarbonates have from 10-400 recurring carbonate units of the formula:

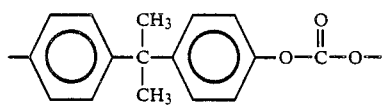
[III]

The polycarbonate resins have a number average molecular weight in the range of from about 10,000 to about 200,000 and from about 20,000 to about 100,000.

Suitable polycarbonates may also be prepared by known melt processes.

The polyphthalatecarbonate resin is derived from (a) a carbonate precursor (b) a dihydric phenol and (c) a phthalate composition. Suitable carbonate precursors and dihydric phenols are set out above. Preferably the mole ratio of dihydric phenol to the total combined moles of carbonate precursor and phthalate composition reacted to obtain the polyphthalatecarbonate resin is from between 48:52 to 52:48 and more preferably about 50:50. Preferably the phthalate composition is in a mole ratio to the carbonate precursor at from about 1:5 and 9:1 and more preferably in a mole ratio between about 2:5 and 4:1 and most preferably about 5:2. These mole ratios of phthalate composition to carbonate precursor are calculated by dividing the moles of phthalate composition reacted to obtain the polyphthalatecarbonate by moles of carbonate precursor reacted to obtain the polyphthalatecarbonate. If an interfacial process is employed, it is preferred that the carbonate precursor is phosgene, the dihydric phenol is bisphenol A, and the phthalate composition is a mixture of terephthaloyl dihalide and isophthaloyl dihalide wherein the mole ratio of terephthaloyl dihalide to isophthaloyl dihalide can vary from 2:98 to 50:50. More preferably the phthalate composition comprises from about 80 to 95 mole percent isophthalate or derivatives thereof based on the total moles in the phthalate composition and from about 20 to 5 mole percent terephthalate or derivatives thereof based on the total moles in the phthalate composition, and most preferably about 93 mole percent isophthalate and about 7 mole percent terephthalate or derivatives thereof. The polyphthalatecarbonate may be prepared following the procedure of Quinn, U.S. Pat. No. 4,238,596 for the preparation of polyestercarbonates which is incorporated herein by reference. The polyphthalatecarbonate resin can be random, random-block or block copolymers having the general formula:

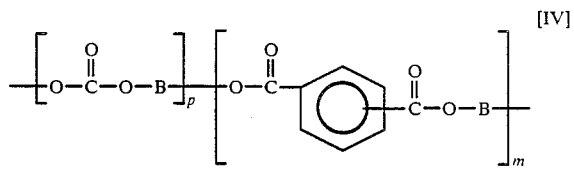
[IV]

wherein B is independently selected from

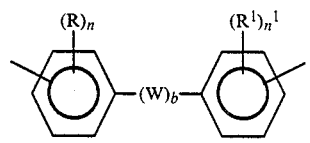
[V]

wherein p represents the moles of carbonate units in the polyphthalate carbonate and m represents the moles of phthalate units in the polyphthalate carbonate. Preferably the ratio of m to p is from between about 1:5 and 9:1 and more preferably from between about 2:5 and 4:1 and most preferably about 5:2. The preferred polyphthalatecarbonate resin is a random or block copolymer represented as follows:

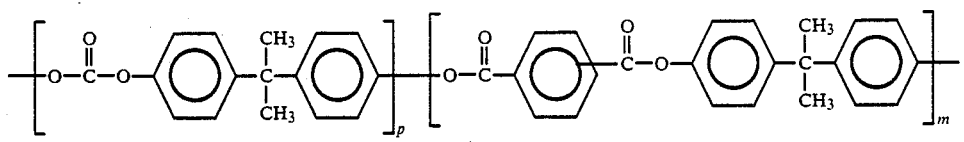

Following the procedures of Quinn U.S. Pat. No. 4,238,596 for the preparation of polyestercarbonates, polyphthalatecarbonates can be prepared from the condensation of phosgene, isophthaloyl dichloride, terephthaloyl dichloride with bisphenol A and a chain stopper, p-tertiary butyl phenol.

The polyphthalatecarbonate resins in general have from about 15 to about 90 mole percent phthalate units, preferably about 30 to about 80 mole percent phthalate units and more preferably about 70 mole percent phthalate units. If five moles of bisphenol-A react completely with four moles of isophthalic acid dichloride and one mole of phosgene, a polyphthalate-carbonate resin having 80 mole percent phthalate units is prepared.

The polyphthalatecarbonate resin may be prepared by either interfacial polymerization or via a melt process. These polyphthalatecarbonate resins have a number average molecular weight in the range of from about 10,000 to about 20,000, preferably from about 20,000 to about 100,000.

In the blends of the present invention (a) the aromatic polycarbonate resin is present at a level selected from between about 80 and about 95 percent by weight of the blend; more preferably at a level of from between about 82.5 and about 94 percent by weight thereof, and most preferably at a level of about 92 percent by weight thereof; and (b) the polyphthalate-carbonate resin is present at a level selected from between about 5 and about 20 percent by weight of the blend, more preferably at a level from between about 17.5 and about 6 percent by weight thereof, and most preferably at a level of about 8 percent by weight thereof. The blend will comprise carbonate units from both the polycarbonate resin and the polyphthalate carbonate resin and will further comprise phthalate units from the polyphthalatecarbonate. The phthalate units preferably represent at least 3.5 mole percent of the combined total of carbonate units and phthalate units of the blend. The blends of the present invention exhibit excellent mechanical properties such as high impact strength while also exhibiting high levels of transparency, low levels of initial yellowness, and excellent resistance to yellowing and hazing upon extended exposure to ultraviolet radiation. By the blending of a small percentage of polyphthalatecarbonate resin with the aromatic polycarbonate resin the polyphthalatecarbonate resin provides an effective level of protection from ultraviolet radiation to the blend. This protection results form the phthalate units in the blend undergoing a photo-fries rearrangement that creates ketone linkages which act as UV radiation screeners. The blends of the present invention have neither the high levels of surface yellowing experienced by straight polyphthalatecarbonate resins nor the high degree of yellowing experienced by polycarbonate resin after extended exposure to ultraviolet radiation.

The following examples are provided by way of illustration and not by way of limitation.

The effect of ultraviolet radiation upon the blends was determined by employing a Q Panel Co. QUV in which samples were exposed in 12 hour cycles to 8 hours of UV radiation from QFS-40UVA lamps at 70° C. followed by 4 hours of darkness at 50° C. and 100 percent humidity.

EXAMPLES

TABLE 1

CHANGE IN HAZE UPON QUV AGING FOR BLENDS OF POLYCARBONATE RESIN WITH POLYPHALATE-CARBONATE RESIN

| WT % POLY-PHTHALATE-CARBONATE RESIN IN THE BLEND[a] | Change in Haze (%) With Hours of QUV Aging[b] | | | |
|---|---|---|---|---|
| | 100 | 400 | 700 | 1000 |
| Control (0.0) | −1 | 0 | 3 | 8 |
| 8.1 | −1 | 0 | 1 | 2 |
| 17.5 | 0 | 0 | 1 | 1 |
| 26 | 0 | 0 | 1 | 1 | a. Blends consisted essentially of a bisphenol-A polycarbonate resin and a polyphthalatecarbonate resin. The polyphthalatecarbonate resin was derived from the reaction of bisphenol-A with phosgene and a phthalate composition. The polyphthalatecarbonate for Table 1 and Table 2 had 72 mole percent phthalate units and 28 mole percent carbonate units, the phthalate composition employed was 7 mole percent terephthaloyl dichloride and 93 mole percent isophthaloyl dichloride based on the total moles of phthalate composition. The polycarbonate resin was derived from the reaction of bisphenol-A with phosgene. Weight percent of polyphthalatecarbonate resin is based on the total weight of polyphthalate carbonate resin and polycarbonate resin employed in the blend.

b. Time is given in hours as total light time. The samples were exposed as follows: Cycles of 8 hrs of light at 70° C. followed by 4 hrs of darkness at 50° C., at 100% relative humidity, and QFS-40 UVA lamps were used. The samples were in the form of 1.5 mil film.

c. The haze of a material is defined as that percentage of transmitted light which when passing through the specimen deviates from the incident beam by forward scattering (deviation >2.5 degrees).

TABLE 2

CHANGE IN YI AFTER 1000 HRS OF QUV AGING FOR POLYCARBONATE BLENDS CONTAINING POLYPHTHALATECARBONATE RESIN.

| WT. % Polyphthalatecarbonate In the Blend[a] | Delta YI[c] at 1000 hrs[b] |
|---|---|
| Control (0.0) | 18 |
| 8.1 | 10 |
| 17.5 | 8 |
| 26.0 | 8 | a. Blends consisted essentially of a polyphthalatecarbonate resin and an aromatic polycarbonate resin as in Table 1.

b. Time is given in hours at total light time. The samples were exposed as follows: Cycles of 8 hrs of light at 70° C., followed by 4 hrs of darkness at 50° C. at 100% relative humidity, and QFS-40 UVA lamps were used. The samples were in the form of 1.5 mil film.

c. Yellowness index is defined as the deviation in chroma from whiteness in the dominant wavelength range from 570 to 580 m.

As can be seen from the examples in Tables 1 and 2, a blend of a small weight percent of polyphthalate carbonate with polycarbonate greatly reduces the polycarbonates tendencies towards yellowing and hazing.

We claim:

1. A blend comprising:
   (a) a polyphthalatecarbonate resin present in said blend at a level of about 8 percent by weight based on the total weight of the blend, said polyphthalatecarbonate resin consisting essentially of carbonate units and phthalate units, wherein said carbonate units are represented by the formula:

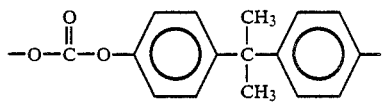

and said phthalate units are represented by the formula:

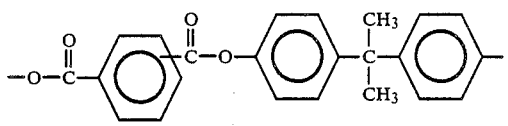

said phthalate units being present at a level of at least 3.5 mole percent based on the combined total moles of carbonate units and phthalate units in said blend; and
   (b) an aromatic polycaronate resin present in said blend at a level of about 92 percent by weight based on the total weight of the composition, said polycarbonate resin consisting essentially of carbonate units.

2. The blend of claim 1 wherein said phthalate units are present in said polyphthalate resin at a level of from 15 to 90 mole percent based on the total moles of phthalate units and carbonate units in said polyphthalatecarbonate resin.

3. The blend of claim 1 wherein said phthalate units are present in said polyphthalate resin at a level of from 30 to 80 mole percent based on the total moles of phthalate units and carbonate units in said polyphthalatecarbonate resin.

4. The blend of claim 1 wherein said phthalate units are present in said polyphthalate resin at a level of from 70 to 90 mole percent based on the total moles of phthalate units and carbonate units in said polyphthalatecarbonate resin.

5. The blend of claim 1 wherein said polycarbonate resin is derived from the reaction of bisphenol-A and phosgene.

6. The blend of claim 1 wherein said polyphthalatecarbonate resin is derived from:
   (a) a carbonate precursor;
   (b) a dihydric phenol; and
   (c) a phthalate composition.

7. The blend of claim 6 wherein said carbonate precursor is phosgene, said dihydric phenol is 2,2-bis(4-hyroxyphenyl)propane, said phthalate composition is a mixture of terephthaloyl chloride and isophthaloyl chloride.

8. A blend comprising:
   (a) a polyphthalatecarbonate resin present in said blend at a level of from about 5 to 8 weight percent based on the total weight of the blend, said polyphthalatecarbonate resin consisting essentially of carbonate units and phthalate units, said phthalate units being present in said blend at a level of at least 3.5 mole percent based on the combined total moles of carbonate units and phthalate units in said blend, wherein said carbonate units are represented by the formula:

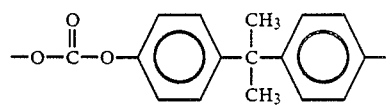

and said phthalate units are represented by the formula:

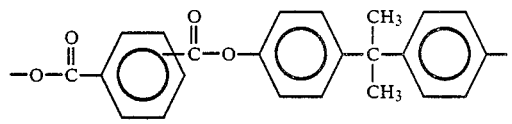

and
   (b) an aromatic polycarbonate resin present in said blend at a level of from 95 to 92 weight percent based on the total weight of the blend, said polycarbonate resin consisting essentially of carbonate units of the formula:

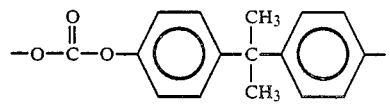

9. A blend consisting essentially of:
   (a) a polyphthalatecarbonate resin present in said blend at a level of from about 5 to 8 weight percent based on the total weight of the blend, said polyphthalatecarbonate resin consisting essentially of carbonate units and phthalate units, said phthalate units being present in said blend at a level of at least 3.5 mole percent based on the combined total moles of carbonate units and phthalate units in said blend, wherein said carbonate units are represented by the formula:

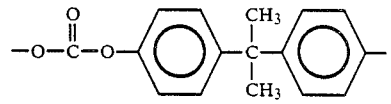

and said phthalate units are represented by the formula:

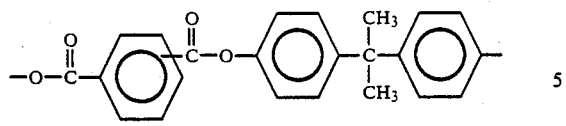
and
(b) an aromatic polycarbonate resin present in said blend at a level of from 95 to 92 weight percent based on the total weight of the blend, said polycarbonate resin consisting essentially of carbonate units of the formula:
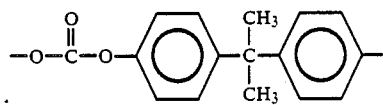
* * * * *